US008260319B2

(12) United States Patent
Wenger et al.

(10) Patent No.: US 8,260,319 B2
(45) Date of Patent: Sep. 4, 2012

(54) WIRELESS TRANSCEIVER

(75) Inventors: Fabian Wenger, Göteborg (SE); Mats Nordlund, Mölndal (SE)

(73) Assignee: Rosemount Tank Radar AB, Gothenburg (SE)

( * ) Notice: Subject to any disclaimer, the term of this patent is extended or adjusted under 35 U.S.C. 154(b) by 1121 days.

(21) Appl. No.: 12/136,361

(22) Filed: Jun. 10, 2008

(65) Prior Publication Data
US 2009/0305650 A1 Dec. 10, 2009

(51) Int. Cl.
*H04W 24/00* (2009.01)

(52) U.S. Cl. ............... 455/456.3; 455/456.1; 455/456.6; 455/41.2; 455/67.11; 455/67.14; 455/67.16; 73/1.79; 342/118; 342/125; 342/127; 340/539.1; 340/539.13; 340/539.22; 340/539.23

(58) Field of Classification Search .... 455/456.1–456.6, 455/41.1–41.2, 161.1–161.2, 67.11, 67.13, 455/67.16, 67.14; 73/1.78, 1.79; 342/82, 342/83, 89, 95, 98, 99, 118, 127, 128, 130, 342/357.78, 357.51, 458, 417–419, 125; 340/505, 539.1, 539.13, 539.22, 539.23, 340/539.32, 568.1, 572.1
See application file for complete search history.

(56) References Cited

U.S. PATENT DOCUMENTS

| 5,485,163 A * | 1/1996 | Singer et al. ............... 342/457 |
| 5,633,642 A * | 5/1997 | Hoss et al. .................... 342/70 |
| 5,659,321 A * | 8/1997 | Burger et al. ................. 342/124 |
| 5,942,688 A * | 8/1999 | Kimura et al. .................. 73/598 |
| 7,184,712 B2 * | 2/2007 | Belcea ...................... 455/67.11 |
| 7,289,813 B2 * | 10/2007 | Karaoguz ................... 455/456.1 |
| 7,630,684 B2 * | 12/2009 | Forster ......................... 455/41.2 |
| 7,639,137 B2 * | 12/2009 | Mukherjee .................. 340/572.1 |
| 7,884,753 B2 * | 2/2011 | Peczalski et al. .............. 342/44 |
| 7,937,042 B2 * | 5/2011 | Light et al. ................. 455/67.11 |
| 2005/0099333 A1 | 5/2005 | Gila et al. .................... 342/118 |

FOREIGN PATENT DOCUMENTS

| EP | 1 445 625 A1 | 2/2003 |
| EP | 1 764 623 A1 | 9/2005 |
| EP | 1 770 409 A1 | 9/2005 |
| WO | WO 03/019229 | 3/2003 |

* cited by examiner

*Primary Examiner* — Tuan A Tran
(74) *Attorney, Agent, or Firm* — Westman, Champlin & Kelly, P.A.

(57) ABSTRACT

The present invention relates to a method for determining a distance between a wireless transceiver and a wireless receiver arranged to communicate with each other in a wireless communication network, the wireless receiver having an active and an inactive reception state, the method comprising transmitting, with the wireless receiver in the active reception state, a first transmission signal, receiving a first reflection signal, the first reflection signal being a reflection of the first transmission signal and influenced by the active reception state of the wireless receiver, transmitting, with the wireless receiver in the inactive reception state, a second transmission signal, receiving a second reflected signal, the second reflection signal being a reflection of the second transmission signal and influenced by the inactive reception state of the wireless receiver, and determining a distance between the wireless transceiver and the wireless receiver based on the second reflection signal.

29 Claims, 2 Drawing Sheets

WIRELESS TRANSCEIVER

TECHNICAL FIELD OF THE INVENTION

The present invention relates to a method for determining a distance between a wireless transceiver and a wireless receiver in a wireless network.

TECHNICAL BACKGROUND

Recently, there has been a steady stream of new data communication standards to increase the cooperation between small electronic wireless devices, also denoted as wireless nodes. In line with this increased demand, a number of wireless technologies have been developed, including for example Bluetooth, ZigBee, wireless USB and similar technologies, that typically permit communication within about 10 meters—in other words, a very short range. These short range private ad-hoc networks are commonly denoted as wireless personal area networks (WPANs) or wireless sensor net.

The objective with a WPAN is to facilitate seamless operation among home or business devices and systems, and every wireless node in a WPAN will be able to wirelessly connect to any other wireless node in the same WPAN, provided they are within wireless transmission range of one another or can communicate via other nodes in the same network. Applications include for example cable-free connections for alarms, appliances and entertainment systems.

An example of a suitable network protocol for a WPAN is the IEEE standard 802.15, where for example Bluetooth is included (IEEE 802.15.1), which is suitable for low-power digital radios such as wireless headphones connecting with cell phones via short-range radio. Another example is the ZigBee specification (IEEE 802.15.4), which is targeted towards industrial and building automation. The ZigBee technology is intended to be simpler and cheaper than e.g. Bluetooth, and thus targets radio-frequency (RF) applications that require a low data rate and long battery life. A problem with WPAN is however that the current implementation of the network topology lacks knowledge of the accurate distance between the different wireless nodes or that the means to determine the distance are specific to the chosen protocol and in some cases not included as a compulsory requirement for the wireless nodes, thus leading to interoperation problems for position related services.

In trying to solve this problem, a method for determining the relative position of a wireless node in a wireless network has been provided by US 2005/0099333, disclosing a method for determining the distance between a base station and a mobile object. The key feature of the disclosed method is to determine differences in carrier phases being backscattered to the base station from the mobile object, where the difference will be used for determining the distance between the base station and the mobile object. However, this method uses technology solely suitable for mobile to base station communication, and will thus not be useful in relation to a WPAN. Furthermore, the method disclosed has no means to distinguish backscattered radiation from the mobile device from the abundance of passive metallic reflectors in a typical WPAN/wireless sensor network environment.

There is thus a need for an improved method for determining a distance between different wireless nodes in a short range ad-hoc network system such as a WPAN.

OBJECTS OF THE INVENTION

In view of the above-mentioned and other drawbacks of the prior art, a general object of the present invention is to provide an improved method for determining a distance between different wireless nodes in a short range ad-hoc network system such as a WPAN.

An object of the present invention is also to provide for the possibility to determine the relative position of a wireless transceiver in a wireless network.

SUMMARY OF THE INVENTION

According to a first aspect of the invention, these and other objects are achieved through a method for determining a distance between a wireless transceiver and a wireless receiver arranged to communicate with each other in a wireless communication network, the wireless receiver having an active and an inactive reception state, the method comprising transmitting, with the wireless receiver in the active reception state, a first transmission signal, receiving a first reflection signal, the first reflection signal being a reflection of the first transmission signal and influenced by the active reception state of the wireless receiver, transmitting, with the wireless receiver in the inactive reception state, a second transmission signal, receiving a second reflected signal, the second reflection signal being a reflection of the second transmission signal and influenced by the inactive reception state of the wireless receiver, and determining a distance between the wireless transceiver and the wireless receiver based on the second reflection signal.

The present invention is based upon the realization that it is possible to derive a distance measure between a transceiver and a receiver based on a signal being reflected back to the transceiver, where the receiver is set in an inactive reception state. The reason for this is the fact that in the inactive reception state the receiver will not consume any energy and the amount of reflected energy will be large. The determination of the distance between the transceiver and the receiver may thus be based on the second reflected signals. The invention thus provides for an improved measure of distance determination between wireless nodes having only one or a few nodes are equipped with means to determine an accurate distance while most other wireless nodes only need extremely simple synchronization means, providing only at least two reception states (on and off). This allows for exact positioning even if the nodes follow different communication standards in the same band, as well as for example the possibility to further increase the controllability in relation to the determination of quality of service (QoS). It should be noted that the steps of transmitting the second transmission signal and receiving the second reflection signal may be performed before the steps of transmitting the first transmission signal and receiving the first reflection signal. That is, the order in which the steps are performed is not limited to transmitting and receiving the first signals before the second signals, and may be performed in any order that is suitable.

Also, in the context of the present invention, the definition of "wireless" in the essence of the wireless transceiver, the wireless receiver and the wireless communication network is to be understood to relate to the wireless data communication between the transceiver and the receiver over a wireless link or communication channel within the wireless communication network. Accordingly, the transceiver and/or the receiver may be powered by means of either of or a combination of a mobile power source (such as a battery) and a wired power supply (such as the mains).

Preferably, the method according to the invention further comprises the step of identifying the wireless receiver based on a difference between the first and the second reflection signal, or alternatively solely based on the second reflection signal. Accordingly, the reflected signal (i.e. the first reflection signal) will in the active reception state be smaller as the receiver in this state will consume energy received from the transceiver. Conversely, in the inactive reception state the receiver will not consume any energy and the amount of reflected energy will be larger (i.e. the receiver will provide a different reflection depending on if it is active or inactive). The identification of the wireless receiver may thus be based on the second reflected signal and/or a comparison of the difference between the first and second reflected signal and each of the first and the second reflected signals, respectively. The invention thus provides for an improved measure of distance determination between different wireless nodes. In concept, the step of determining the distance between the wireless transceiver and the wireless receiver may alternatively be seen to include determining a difference between the first and the second reflection signal.

Consequently, it is necessary to synchronize the transceiver and the receiver such that the receiver switches state between active and inactive with an adequate timing of the wireless nodes. Preferably, the receiver is initially in the active reception state such that it may receive a synchronization signal from the transceiver. The synchronization signal may be embedded with the information transmitted in the first transmission signal, but may also be sent separately, either before or after the transmission of the first transmission signal. The synchronization information may also be communicated (e.g. embedded) in the header of the transmission signal, wherein the header preferably is a network header, but possibly can be any type of header. Other type of common headers are PHY headers, MAC headers, transport headers, etc.

Thus, in case the wireless network comprises additional wireless nodes, e.g. at least one additional wireless receivers and/or wireless transceivers, the invention further comprises transmitting a plurality of transmission signals, receiving a plurality of reflection signals, determining a plurality of distances between the wireless transceiver and the additional wireless receiver based on the plurality of reflection signals, and determining the relative position of the wireless transceiver in the wireless network based on the determined distances. Accordingly, the wireless receivers may alternatively also be configured to comprise a transmission portion for allow wireless transmission, thus also making them wireless transceivers.

By e.g. sequentially switching the reception state for each of the receiver between the active and the inactive state it will thus be possible to discriminate wireless nodes (e.g. other transceivers and receivers) from clutter in the environment. That is, switching between the active and inactive reception state of the wireless nodes will make it possible to determining the two-way delay between the different wireless nodes, i.e. by using the information of the backscattered transmitted signal. By collecting such data in an ad-hoc network it will be possible to find accurate positions of an ad hoc network infrastructure. Accordingly, it is preferred if each of, or at least a majority of, the distances between the different wireless nodes are communicated to each of the wireless nodes, for example by means of a roaming signal comprising such information. Additionally, it will be possible to also determine a change in the relative position of any of the wireless nodes, and to use the relative position of the different wireless nodes to control the integrity of the wireless network, e.g. such that wireless nodes are not exchanged without permission or not being restored after for example a maintenance.

The active reception state of the wireless receiver preferably influences the reflected signal by arranging an antenna element of the wireless receiver in a matched state in relation to a frequency of the transmission signal, and the inactive reception state of the wireless receiver preferably influences the reflected signal by arranging the antenna element of the wireless receiver in a high impedance off state, i.e. such that the antenna element does not conduct the transmission signal to the receiver. Differently put, an impedance of an antenna element of the wireless receiver in the inactive reception state is controlled such that the transmission signal is reflected, and in the active reception state is controlled such that the antenna element conducts the transmission signal to the wireless receiver. As such, when in the active reception state the antenna element of the receiver is matched with the transmission signal such that the receiver essentially completely consumes the electromagnetic energy contained in the transmission signal that reaches the receiver and thereby only reflects a minor part of the transmission signal back to the transceiver (as the reflected signal). Conversely, in the inactive reception state the antenna element is switched off, or arranged in a high impedance state, where instead the transmission signal essentially completely is reflected back to the transceiver, i.e. the electromagnetic energy in the transmission signal is reflected back as the reflected signal. The switching of the state of the antenna element is for example provided by means of an antenna coupler, switch, or other similar arrangements.

Further, a combination of the active and inactive antenna elements may be used for at least one of maximizing a backscattered signal and to determine the relative position and orientation of the transceiver.

According to prior art, the simplest method in use to give a relative distance in WPAN is to use the RSSI (receive signal strength indicator) along with a simplified channel model to provide an estimate. This method can give highly misleading results in environments without line-of-sight conditions and is of little use in these situations. However, according to the invention, a comparison of the reflected signals in the two different receptions states (i.e. the active and the inactive state) as discussed above can discern the state of scattering by passive elements and possibly several reflected communication path between the transceiver and the active/inactive receiver and provide a valuable indicator on reliability of the distance estimation.

Furthermore, some other prior art methods measure a given two way delay between messages sent back and forth, where an exact value of the processing delay requires highly accurate clocks in both nodes and compatible protocol and transmission means in the receiver node. The exact scheduling of the return message might therefore interfere with the service requirements of other messaging creating potentially a quality of service conflict. In the method according to the invention the requirements on the receiver are greatly relaxed. Only simple synchronization, providing a suitable interval in active and inactive state are necessary, which occur naturally in access schemes for wireless networks.

In an embodiment of the invention the transmission signals are modulated according to a multi-carrier modulation protocol such as an OFDM modulation protocol, preferably adapted such that a sub-carrier of the OFDM modulated transmission signal have an increased amplitude at frequencies where a reflection signal is increased. OFDM is a modulation form that is a wireless communication modulation that excels when the channel is frequency selective, i.e. when at certain frequencies the communication between two nodes experiences extremely high attenuation due to multi-path extinction. Communication can nevertheless proceed reliably due to the spread of information on a large number of narrowband sub-carriers, some experiencing large and some small attenuation. Coding the information uniformly over all of them allows reconstruction by weighing the information according to the quality of reception of a particular sub-carrier. Similarly, for a distance determination the estimate can be taken from the phase increase between sub-carriers experiencing very low attenuation, which results in a more accurate estimate of distance.

Since most WPAN are deployed in areas with a huge number of metallic objects in office spaces and homes the ability to cope with typical multi-path channels with frequency selective properties is crucial for practical use, this type of robust communication and distance estimation is provided by OFDM. Additionally, the OFDM modulated transmission signal may be adapted to have a pulse shape corresponding to a FMCW or impulse type pulse shape common in radar systems.

The concept of OFDM is based on the use of large number of closely-spaced orthogonal sub-carriers for carrying data. The data are divided into several parallel data streams or channels, one for each sub-carrier. Each sub-carrier is modulated with a conventional modulation scheme (such as quadrature amplitude modulation or phase shift keying) at a low symbol rate, maintaining total data rates similar to conventional single-carrier modulation schemes in the same bandwidth. The primary advantage of OFDM over single-carrier schemes is its ability to cope with severe channel conditions, for example, attenuation of high frequencies, narrowband interference and frequency-selective fading due to multi-path, without complex equalization filters. Channel equalization is made simplified because OFDM may be viewed as using many slowly-modulated narrowband signals rather than one rapidly-modulated wideband signal. The low symbol rate makes use of a guard interval between symbols affordable, making it possible to handle time-spreading and eliminate inter-symbol interference (ISI). This mechanism also facilitates the design of single-frequency networks, where several adjacent transceivers send the same signal simultaneously at the same frequency, as the signals from multiple distant transceivers may be combined constructively, rather than interfering as would typically occur in a traditional single-carrier system. The advantage with using OFDM in relation to the invention is that, in comparison to a single carrier modulation, is that OFDM has an inherent strength to reliably pass information on frequency selective channels.

By introducing a sufficiently large number of orthogonal small bandwidth carriers in the transceiver with minimal frequency spacing, each of these sub-carriers experiences flat fading through its channel meaning that the channel equalization becomes a trivial phase rotation and amplitude scaling. Technology-wise this is made possible due to the availability of Fast Fourier Transforms to generate and analyze the waveform from/into non-overlapping carriers at discretely spaced frequencies.

Use of antenna arrays (e.g. an antenna comprising a plurality of antenna elements) will allow for the possibility to switch antennas from matched to high impedance states (non-reflecting to reflecting) and to create orientation information in a network, as it is not necessary that all antenna elements for a receiver has to be switched at one time.

According to a second aspect of the invention, wireless transceiver is provided together with a wireless receiver arranged to communicate with each other in a wireless communication network, the wireless receiver having an active and an inactive reception state, the wireless transceiver comprising a transmitter for transmitting a first transmission signal with the wireless receiver in the active reception state and a second transmission signal with the wireless receiver in the inactive reception state, a receiver for receiving a first and a second reflection signal, the first reflection signal being a reflection of the first transmission signal and influenced by the active reception state of the wireless receiver, and the second reflection signal being a reflection of the second transmission signal and influenced by the inactive reception state of the wireless receiver, and a control unit adapted to determine a distance between the wireless transceiver and the wireless receiver based on the second reflection signal.

The transceiver and/or receiver may preferably be included in a consumer electronic device (CED) such as at least one of a television set (TV), a Digital Versatile Disc player (DVD), and a Home Theatre System (HTS), a router or any other similar wireless device. It may however also be possible to include the transceiver and/or receiver in an industrial application such as for example a field device used in the process industry. Further effects analogous to those described above in connection with the first aspect of the invention are also obtained through this second aspect of the present invention.

According to a third aspect of the invention, there is provided a wireless communication network comprising a wireless transceiver and a wireless receiver arranged to communicate with each other, the wireless receiver having an active and an inactive reception state, the wireless transceiver comprising a transmitter for transmitting a first transmission signal with the wireless receiver in the active reception state and a second transmission signal with the wireless receiver in the inactive reception state, a receiver for receiving a first and a second reflection signal, the first reflection signal being a reflection of the first transmission signal and influenced by the active reception state of the wireless receiver, and the second reflection signal being a reflection of the second transmission signal and influenced by the inactive reception state of the wireless receiver being different from the first reception state, and a control unit adapted to determine a distance between the wireless transceiver and the wireless receiver based on the second reflection signal.

Similarly, further effects analogous to those described above in connection with the first and/or second aspect of the invention are also obtained through this third aspect of the present invention. It should also be noted that the wireless network may be a short range ad-hoc network or wireless sensor network, and that the short range ad-hoc network may be configured in accordance to at least one of the IEEE 802.11 standard, the IEEE 802.15 standard, the IEEE 802.16 standard or the IEEE 802.20 standard. The skilled addressee of course understands that the concept of the invention may be useful in combination with other wireless standards. Examples of other types of wireless standards includes e.g. proprietary wireless standards used for example in the processing industry.

According to a fourth aspect of the invention, there is provided a wireless transceiver, comprising a transmitter for transmitting an outgoing radio-frequency (RF) communication signal to a wireless node, a receiver for receiving RF communication signals carrying data from the wireless node including an echo signal resulting from reflection of said outgoing RF communication signal at said wireless node, and a control unit adapted for extracting said data from the received RF communication signal, and further adapted for determining a distance between the wireless transceiver and the wireless node based on said echo signal.

Accordingly, such a wireless transceiver will have the possibility to both transmit and receive data communication by means of RF communication signal, as well as for determining a distance between the wireless transceiver and the wireless node. Thus, the wireless transceiver may be suitable for example for being integrated as a block in an integrated circuit. The control unit may preferably be further adapted for, similarly as discussed above, for generating a synchronization signal to be transmitted to the wireless node for allowing the wireless transceiver with the wireless node. Consequently, the control unit may be further adapted to identifying the wireless node based on a difference between a first and a second echo signal resulting from reflection of outgoing RF communication signals at said wireless node, wherein the wireless node changes its reception state between an active and an inactive state between the reflection of the first and the second echo signals.

Thus, further effects analogous to those described above in connection with the first, second and/or third aspect of the invention are also obtained through this fourth aspect of the present invention.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF A PREFERRED EMBODIMENT OF THE INVENTION

Figure 1:
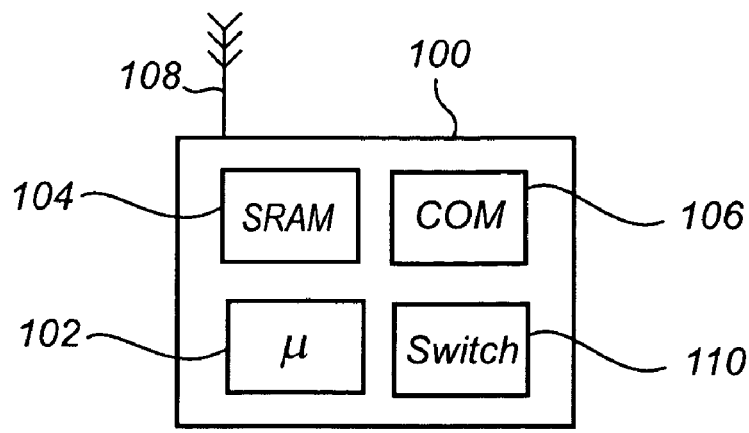
FIG. 1 is a conceptual block diagram of a wireless transceiver according to a currently preferred embodiment of the present invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted a block diagram of a wireless transceiver 100 for use in a wireless network. The wireless transceiver 100 comprises a processor 102, a memory 104, a wireless module 106 and an antenna 108. The wireless transceiver 100 may be arranged to be used in conjunction with any number of wireless communication platforms such as, e.g., a wireless local area network (WLAN), a wireless personal area network (WPAN), wireless metro-area networks (WMAN), cellular networks, and similar present and future networks. Further, the wireless transceiver 100 may be integrated as a component in a wide range of electronic devices having wireless communication capability including, for example, a laptop, palmtop or desktop computer, a cellular telephone, a personal digital assistant, an WLAN access point (AP), a WLAN station (STA), a wirelessly enabled field unit, and the like.

The processor 102 may be any type of suitable processor, and may preferably be a processor suitable for use in conjunction with a truly wireless device, thereby having a low power consumption, include e.g. a microprocessor, microcontroller, programmable digital signal processor or another programmable device. The functionality of the processor 102 may also, or instead, be included as a building block in an application specific integrated circuit, a programmable gate array, programmable array logic, a programmable logic device, or a digital signal processor. As in the illustrated embodiment, where the processor 102 is a programmable device, the processor 102 may further include computer executable code that controls operation of the programmable device. The executable code may be stored in the memory 104. The memory 104 also preferably stores an executable code configured for performing the method according to the present invention when executed by the processor 102. Furthermore, the transmission and reception functionality of the wireless transceiver 100 may be provided as a common circuitry or a single housing. Additionally, the transceiver 100 may not necessarily have to share a significant amount of handling circuitry, but can instead also be seen as a transmitter-receiver.

The antenna 108, working in collaboration with the wireless module 106 which comprises a transmitter and a receiver, comprises antenna elements having predetermined antenna characteristics allowing for a matched transmission and reception behavior for the wireless transceiver 100. The antenna elements may be arranged as an antenna array, wherein the antenna characteristics can be electronically controlled by means of the processor 102. It is thus possible, for example, to direct the radiation in a particular direction. In this way the range of a signal transmitted by the wireless transceiver 100 can be increased.

The wireless module 106, in conjunction with the antenna 108 and processor 102, is preferably adapted to provide transmission and reception based on a multi-carrier modulation protocol such as an OFDM modulation protocol. Thus, the wireless transceiver 100 is preferably a multiple input, multiple output (MIMO) transceiver.

The antenna switch 110, which may be an integrated part of the wireless module 106, may be any one of an antenna coupler, switch, or other similar arrangements. The switch 110 thereby allows for the switching of the antenna, and thus the complete transceiver 100, between an active and an inactive reception state.

Figure 2:
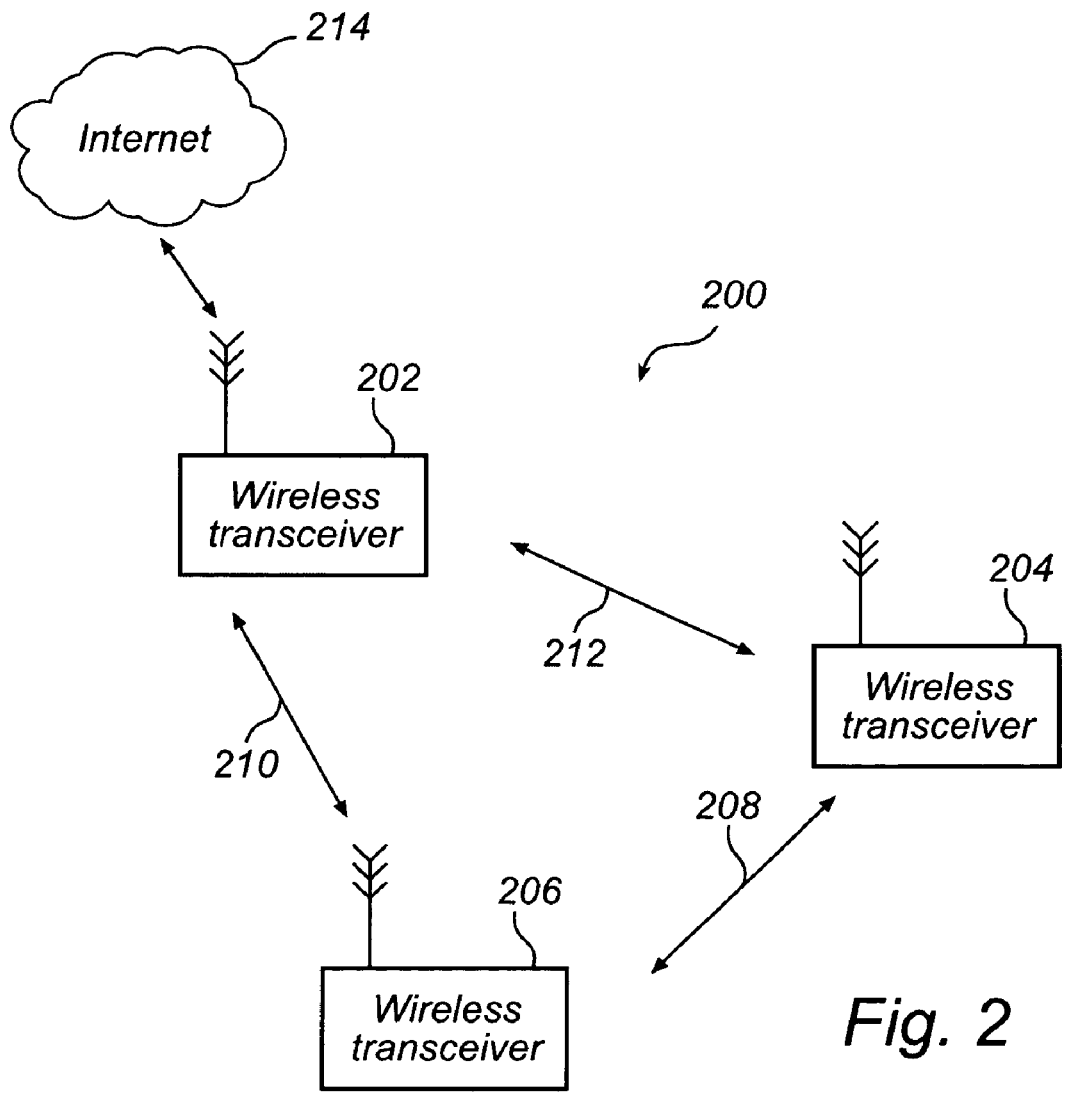
FIG. 2 schematically illustrates a wireless network in which a plurality of wireless nodes are arranged to communicate.

Turning now to FIG. 2, wherein a block diagram of a wireless communication environment within which the teachings of the present invention may be practiced, e.g. by including a wireless transceiver as is illustrated in FIG. 1. As shown, a wireless network 200 depicts three wireless devices 202, 204 and 206 similar to the transceiver 200 of FIG. 1.

As used herein, the wireless transceivers 202, 204 and 206 communicate information between one another via multi-carrier wireless communication channels 208, 210 and 212, established between the respective transceiver through one or more antenna elements associated with the transceivers. As is illustrated in FIG. 2, at least one of the transceivers may be coupled to another network 214, such as the Internet. The network 200 may of course comprise more, or less, than three wireless transceivers. Similarly, not all the wireless devices needs to be transceivers, but may of course solely be receivers. The network 200 may also be organized in accordance to a star or a mesh topology, or any other suitable network topology.

The multi-carrier wireless communication channels 208, 210 and 212 may provide a radio interface between the transceivers 202, 204 and 206 designed to transmit or receive predetermined frequencies of 900 MHz or 2.4 GHz. As a result of the predetermined frequency, it is possible to switch between different frequencies. In this way it is also possible to flexibly match the radio module to legal provisions that are to be met. For example, radio transmission technologies such as WLAN or Bluetooth utilize the ISM (Industrial, Scientific and Medical) band for the transmission of data. The ISM band can be utilized for industrial, scientific or medical applications without a license. The 2.4 GHz band has been released worldwide for industrial, scientific and medical applications. Consequently, the wireless network may be a short range ad-hoc network or wireless sensor network, and the short range ad-hoc network may be configured in accordance to at least one of the IEEE 802.11 standard, the IEEE 802.15 standard, the IEEE 802.16 standard or the IEEE 802.20 standard.

Figure 3:
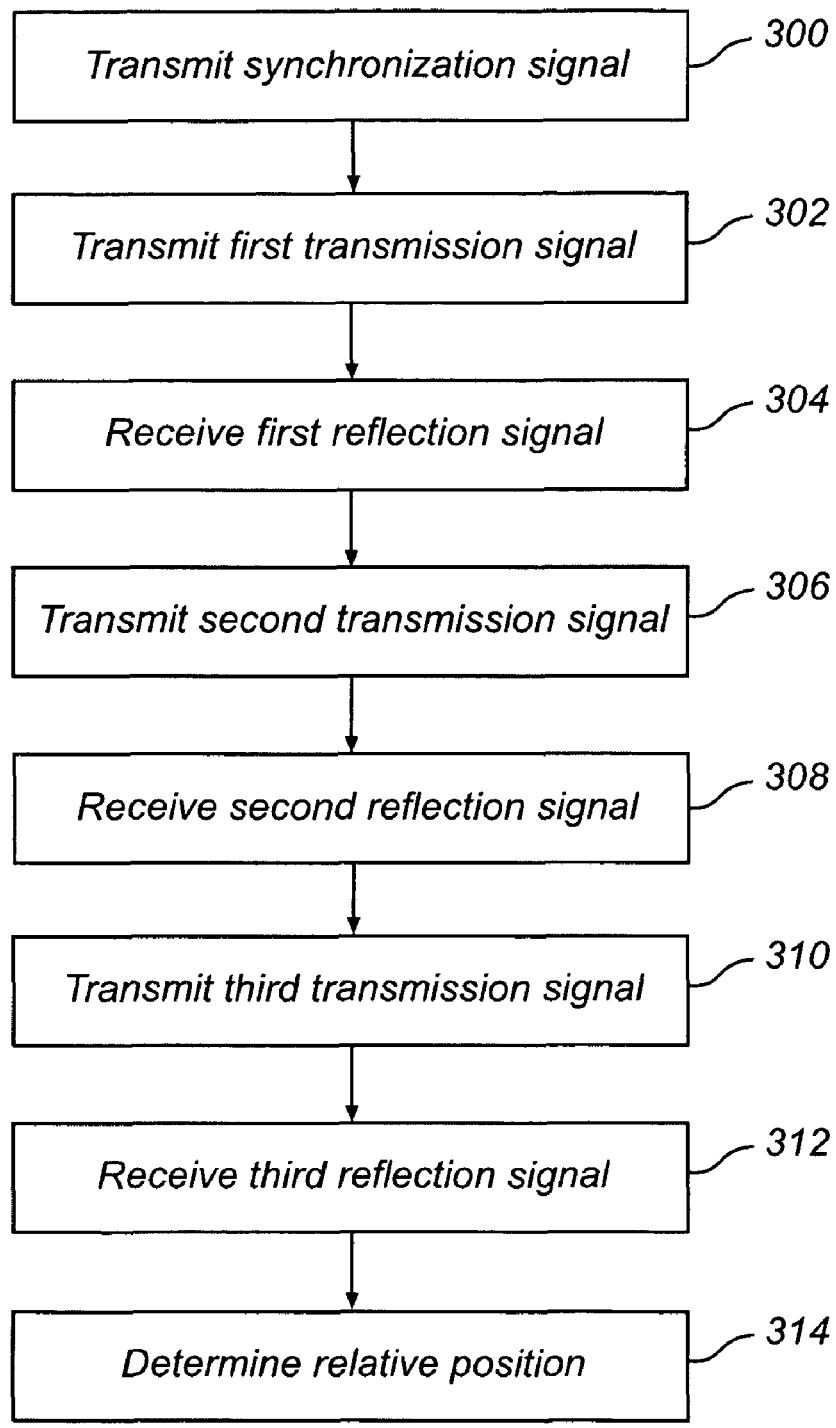
FIG. 3 is a flow chart illustrating the method steps according to a currently preferred embodiment of the present invention.

During operation of the wireless network 200, which is exemplified by means of the flow chart in FIG. 3, at least one of the wireless transceivers 202, 204 or 206 transmits, in a first step 300, a synchronization signal for allowing time synchronization with the other wireless transceivers. As noted above, the synchronization signal be embedded with other information, be sent as a roaming signal for all of the transceivers, or be individually transmitted to each of the transceivers. For simplicity of explanation, the wireless transceiver 202 is selected to take an administrative role, and will thus be the transceiver initiating transmission and transmits the synchronization signal.

At a second step 302, the wireless transceiver 202 transmits a first transmission signal to be received by the other transceivers 204 and 206. At this step both of the transceivers 204 and 206 are arranged in the active reception stage. Thus, both of the transceivers have been arranged such that their respective antenna switches in conjunction with their respective antennas and wireless modules are arranged to provide a matched reception of the first transmission signal. The transceivers 204 and 206 will thereby consume a majority of the transmission signal received by each of the transceivers 204 and 206.

At a third step 304, preferably executed quickly after the completion of the transmission of the first transmission signal, the transceiver 202 will be arranged in a reception mode for allowing reception of a first reflection signal, where the first reflection signal is a reflection of the first transmission signal and indicative of a first reception state of the wireless network 200. That is, in step 304, as both of the transceivers 204 and 206 are in an active reception state, a smaller part of the electromagnetic energy of the transmission signal (than theoretically possible) will be reflected back as the transceivers 204 and 206 at this point instead consumes the first transmission signal. As understood, the first reflection signal is a backscattered version of the first transmission signal.

Thus, in a fourth step, 306, the transceiver 202 is arranged to transmit a second transmission signal intended for the transceivers 204 and 206. However, at this point in time, the earlier synchronization signal has provided timing information for switching one of the transceivers 204 or 206 to an inactive reception state, in this case transceiver 204. The antenna switch of the transceiver 204 will thus be used for arranging the transceiver 204 in the inactive reception state, thereby arranging the transceiver 204 in a high impedance mode where it instead of consuming electromagnetic energy of the second transmission signal will reflect at least a majority of the second transmission signal back to the transceiver 202. In an embodiment, approximately half of the electromagnetic energy of the second transmission signal is reflected back to the transceiver 202.

In step 308, the transceiver 202, once again arranged in a reception state, will receive a second reflected signal, where the second reflection signal is a reflection of the second transmission signal and indicative of a second reception state of the wireless network 200 being different from the first reception state, which in this case will include the fact that the transceiver 204 has been switched to an inactive reception state.

In step 310 and step 312, the transceiver 202 is arranged to repeat steps 306 and 308, to transmit a third transmission signal and receive a third reflection signal. However, in this case the reception state of the wireless network 200 is again changed such that the transceiver 204 is arranged in the active reception state and the transceiver 206 is arranged in the inactive reception state. Thus, the third reflection signal will be indicative of this configuration.

Thus, in step 314 it will be possible to derive a distance measure between the transceiver 202 and each of the transceivers 204 and 206. The determination is made possible by comparing the first, second and third reflection signals with each other, for example by making use of the two-way delay between the transmission signals and the reception signals. Consequently, it will be possible to determine a relative position for the transceiver 202. In the simplest case the relative phase change of the channel estimate for the transmission signal will give an estimate of a single reflection in the vicinity of the transceiver 202. The estimation technique can be refined to deal with a couple of reflectors thus allowing for mapping of additional objects in the vicinity of the transceiver 202.

Accordingly, it will be possible to include additional steps in which each of the transceivers 204 and 206 (and even further transceivers) are arranged to execute the steps 302-314. An additional step of transmitting a roaming signal in which the distance measures, and possibly relative positions on an arbitrary grid map, are transmitted to each of the transceivers 202, 204 and 206 may then be executed. If one of the transceivers comprises a GPS module for receiving an absolute position, the absolute position of that transceiver may be used for calculating absolute positions for each of the other transceivers.

By knowing the relative position of a transceiver it will be possible to optimize the transmission energy in the direction of other wireless receptors, such as for example the other transceivers. Furthermore, with the advent of array and MIMO antennas in broadband wireless, not only ranging but also direction of arrival may be estimated and a mapping of obstacles according to direction may be synthesized.

Furthermore, the skilled addressee realizes that the present invention by no means is limited to the preferred embodiments described above. On the contrary, the skilled addressee understands that many modifications and variations are possible and within the scope of the appended claims.

What is claimed is:

1. A method for determining a distance between a wireless transceiver and a wireless receiver arranged to communicate with each other in a wireless communication network, the wireless receiver having an active and an inactive reception state, the method comprising:

transmitting, with the wireless receiver in the active reception state, a first transmission signal;

receiving a first reflection signal, the first reflection signal being a reflection of the first transmission signal and influenced by the active reception state of the wireless receiver;

transmitting, with the wireless receiver in the inactive reception state, a second transmission signal;

receiving a second reflected signal, the second reflection signal being a reflection of the second transmission signal and influenced by the inactive reception state of the wireless receiver; and determining a distance between the wireless transceiver and the wireless receiver based on the second reflection signal.

2. Method according to claim 1, wherein the steps of transmitting the second transmission signal and receiving the second reflection signal are performed before the steps of transmitting the first transmission signal and receiving the first reflection signal.

3. Method according to claim 1, further comprising the step of identifying the wireless receiver based on a difference between the first and the second reflection signal.

4. Method according to claim 1, wherein an impedance of an antenna element of the wireless receiver in the inactive reception state is controlled such that the second transmission signal is reflected, and in the active reception state is controlled such that the antenna element conducts the first transmission signal to the wireless receiver.

5. Method according to claim 4, further comprising the step of controlling the antenna element of the wireless receiver for maximizing backscattering of the second reflection signal in the inactive reception state.

6. Method according to claim 1, wherein the determination of the distance between the wireless transceiver and the wireless receiver further comprises the step of determining a two-way delay between at least one of the first and the second transmission signal and the corresponding reception signal.

7. Method according to claim 1, further comprising the step of synchronizing the wireless transceiver with the wireless receiver.

8. Method according to claim 1, wherein the first and the second transmission signals are modulated according to an OFDM modulation protocol.

9. Method according to claim 8, wherein a sub-carrier of a OFDM modulated transmission signal is adapted to have an increased energy at frequencies where the second reflection signal is high.

10. Method according to claim 8, wherein the OFDM modulated transmission signal is adapted to have a pulse shape corresponding to at least one of an FMCW and an impulse type pulse shape.

11. Method according to claim 1, wherein the wireless network further comprises at least one additional wireless receiver, the at least one additional wireless receiver having an active and an inactive reception state, and the method further comprises:
  transmitting a plurality of transmission signals;
  receiving a plurality of reflection signals;
  determining a plurality of distances between the wireless transceiver and the at least one additional wireless receiver based on the plurality of reflection signals; and
  determining the relative position of the wireless transceiver in the wireless network based on the determined distances.

12. Method according to claim 11, wherein only one of the wireless receivers changes its reception state prior to the transmission of each of the transmission signals.

13. A wireless transceiver together with a wireless receiver arranged to communicate with each other in a wireless communication network, the wireless receiver having an active and an inactive reception state, the wireless transceiver comprising:
  a transmitter for transmitting a first transmission signal with the wireless receiver in the active reception state and a second transmission signal with the wireless receiver in the inactive reception state;
  a receiver for receiving a first and a second reflection signal, the first reflection signal being a reflection of the first transmission signal and influenced by the active reception state of the wireless receiver, and the second reflection signal being a reflection of the second transmission signal and influenced by the inactive reception state of the wireless receiver; and
  a control unit adapted to determine a distance between the wireless transceiver and the wireless receiver based on the second reflection signal.

14. Wireless transceiver according to claim 13, wherein the control unit is further adapted to control an impedance of an antenna element of the wireless receiver in the inactive reception state such that the second transmission signal is reflected, and in the active reception state is such that the antenna element conducts the first transmission signal to the wireless receiver.

15. Wireless transceiver according to claim 13, wherein the control unit is further adapted to identifying the wireless receiver based on a difference between the first and the second reflection signal.

16. Wireless transceiver according to claim 13, wherein the first and the second transmission signals are modulated according to an OFDM modulation protocol.

17. Wireless transceiver according to claim 16, wherein the OFDM modulated transmission signal is adapted to have a pulse shape corresponding to at least one of an FMCW and an impulse type pulse shape.

18. A wireless communication network comprising a wireless transceiver and a wireless receiver arranged to communicate with each other, the wireless receiver having an active and an inactive reception state, the wireless transceiver comprising:
  a transmitter for transmitting a first transmission signal with the wireless receiver in the active reception state and a second transmission signal with the wireless receiver in the inactive reception state;
  a receiver for receiving a first and a second reflection signal, the first reflection signal being a reflection of the first transmission signal and influenced by the active reception state of the wireless receiver, and the second reflection signal being a reflection of the second transmission signal and influenced by the inactive reception state of the wireless receiver being different from the first reception state; and
  a control unit adapted to determine a distance between the wireless transceiver and the wireless receiver based on the second reflection signal.

19. Wireless communication network according to claim 18, wherein the control unit is further adapted to control an impedance of an antenna element of the wireless receiver in the inactive reception state such that the second transmission signal is reflected, and in the active reception state is such that the antenna element conducts the first transmission signal to the wireless receiver.

20. Wireless communication network according to claim 18, wherein the control unit is further adapted to identifying the wireless receiver based on a difference between the first and the second reflection signal.

21. Wireless communication network according to claim 18, further comprising at least one additional wireless receiver, the at least one additional wireless receiver each having an active and an inactive reception state, wherein the wireless transceiver is further adapted to:
  transmit a plurality of transmission signals;
  receive a plurality of reflection signals;
  determine a plurality of distances between the wireless transceiver and the at least one additional wireless receiver based on the plurality of reflection signals; and determine the relative position of the wireless transceiver in the wireless network based on the determined distances.

22. Wireless communication network according to claim 18, wherein the first and the second transmission signals are modulated according to an OFDM modulation protocol.

23. Wireless communication network according to claim 22, wherein the OFDM modulated transmission signal is adapted to have a pulse shape corresponding to at least one of an FMCW and an impulse type pulse shape.

24. Wireless communication network according to claim 18, wherein the wireless network is at last one a short range ad-hoc network and a wireless sensor network.

25. Wireless communication network according to claim 24, wherein the short range ad-hoc network is configured in accordance to at least one of the IEEE 802.11 standard, the IEEE 802.15 standard, the IEEE 802.16 standard or the IEEE 802.20 standard.

26. A wireless transceiver, comprising:
a transmitter for transmitting an outgoing radio-frequency (RF) communication signal to a wireless node;
a receiver for receiving RF communication signals carrying data from the wireless node including an echo signal resulting from reflection of said outgoing RF communication signal at said wireless node; and
a control unit adapted for extracting said data from the received RF communication signal, and further adapted for determining a distance between the wireless transceiver and the wireless node based on said echo signal;
wherein the control unit is further adapted to identifying the wireless node based on a difference between a first and a second echo signal resulting from reflection of outgoing RF communication signals at said wireless node, wherein the wireless node changes its reception state between an active and an inactive state between the reflection of the first and the second echo signals.

27. Wireless transceiver according to claim 26, wherein the control unit is further adapted for generating a synchronization signal to be transmitted to the wireless node.

28. Wireless transceiver according to claim 26, wherein the outgoing RF communication signal is modulated according to an OFDM modulation protocol.

29. Wireless transceiver according to claim 28, wherein the OFDM modulated transmission signal is adapted to have a pulse shape corresponding to at least one of an FMCW and an impulse type pulse shape.

* * * * *